(12) United States Patent
Liu et al.

(10) Patent No.: US 10,810,211 B2
(45) Date of Patent: Oct. 20, 2020

(54) DYNAMIC EXPRESSION STICKER MANAGEMENT

(71) Applicant: International Business Machines Corporation, Armonk, NY (US)

(72) Inventors: Su Liu, Austin, TX (US); Steven R. Loomis, Saratoga, CA (US); Cheng Xu, Beijing (CN); Qin Qiong Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 15/590,908

(22) Filed: May 9, 2017

(65) Prior Publication Data
US 2018/0329960 A1 Nov. 15, 2018

(51) Int. Cl.
*G06F 3/00* (2006.01)
*G06F 16/2457* (2019.01)
(Continued)

(52) U.S. Cl.
CPC ........ *G06F 16/24575* (2019.01); *G06F 16/51* (2019.01); *G06F 40/30* (2020.01);
(Continued)

(58) Field of Classification Search
CPC .............. G06F 3/0482; G06F 17/3028; G06F 17/30528; H04L 51/04; H04L 67/306
See application file for complete search history.

(56) References Cited

U.S. PATENT DOCUMENTS

| 2012/0054646 A1* | 3/2012 | Hoomani | A63F 13/79 |
| | | | 715/758 |
| 2013/0174058 A1* | 7/2013 | Kaul | G06F 3/0481 |
| | | | 715/753 |

(Continued)

FOREIGN PATENT DOCUMENTS

CN 106020622 A 10/2016

OTHER PUBLICATIONS

Unruh, A., "Search API Basics," Google Cloud Platform, retrieved from https://cloud.google.com/appengine/training/fts_intro/lesson2, Oct. 2012, pp. 1-11.
(Continued)

*Primary Examiner* — Anil N Kumar
(74) *Attorney, Agent, or Firm* — Zilka-Kotab, P.C.

(57) ABSTRACT

In one embodiment, a method includes selecting a set of criteria related to managing expression stickers. The method also includes determining values for the set of criteria based on input from a first user. In addition, the method includes storing the values for the set of criteria to a user profile created for the first user on a memory. Additionally, the method includes determining meanings for each expression sticker in a set of expression stickers stored to the memory based on content and context of each expression sticker and context of the set of expression stickers. Moreover, the method includes integrating the set of expression stickers with an existing input interface of messaging applications to allow the user to select expression stickers from the set of expression stickers when engaged in a chat or instant messaging session via one of the messaging applications.

19 Claims, 5 Drawing Sheets

(51) Int. Cl.
  *H04L 29/08* (2006.01)
  *H04L 12/58* (2006.01)
  *G06F 16/51* (2019.01)
  *G06Q 10/10* (2012.01)
  *G06Q 50/00* (2012.01)
  *G06F 40/30* (2020.01)
(52) U.S. Cl.
  CPC ........... *G06Q 10/107* (2013.01); *G06Q 50/01* (2013.01); *H04L 51/04* (2013.01); *H04L 67/306* (2013.01)

(56) References Cited

U.S. PATENT DOCUMENTS

| | | | |
|---|---|---|---|
| 2016/0055370 A1 | 2/2016 | Garcia | |
| 2016/0078659 A1* | 3/2016 | Bartkiewicz | G06F 3/0482 715/771 |
| 2016/0154959 A1 | 6/2016 | Chin et al. | |
| 2018/0314409 A1* | 11/2018 | Adilipour | H04W 4/185 |

OTHER PUBLICATIONS

Wikipedia, "Expression package," Wikipedia, retrieved from https://zh.wikipedia.org/wiki/%E8%A1%A8%E6%83%85%E5%8C%85 last updated Apr. 8, 2017, pp. 1-4.

* cited by examiner

DYNAMIC EXPRESSION STICKER MANAGEMENT

BACKGROUND

The present invention relates to chat sessions and related activities, and more specifically to dynamic expression sticker procurement, storage, and management.

Applications that allow for exchanging messages with other users in a chat session (chatting) and/or exchanging instant messages (IMs) with other users are useful for the exchange of ideas. Social media networks and chatting applications, such as WeChat©, WhatsApp©, Facebook©, etc., are the most popular and are messaging applications used today, and there are many hundreds of more such messaging applications, specific to particular languages, communities, interests, etc.

Many of the messaging applications include functionality that allows users to send and receive emoticons, emoji, and in some cases dynamic expression stickers, or just stickers for short.

Emoticons are typographic displays, typically a representation of a facial expression, and are used to convey emotion in a text-only medium. Emoticons may be input using a standard character set, such as with a combination of characters and symbols found on a standard keyboard, e.g., ;-) or :-(or ^_^, etc.

An emoji is a picture character or pictograph that is displayed to a user and may represent any of a plurality of different items, expressions, people, places, etc. Emoji are an extension to the character set typically used by most common operating systems, Unicode, and are represented in Unicode by a single character. There are a limited number of emoji available, and they are typically input using a dedicated interface which displays emoji available for input or via shortcut keystrokes in the specific messaging application being used, e.g., U+2764 is a heavy black heart, U+1F43B is a bear face, etc.

Expression stickers, which are referred to as stamps in some areas, are not characters, but rather are unstructured data. They are used in a number of messaging applications that allow are able to recognize and process the expression sticker data. They may include audio, picture(s), video, or some combination thereof. A typical expression sticker may be a detailed image of a character that represents an emotion or action. Expression stickers have a limitless ability to convey very specific emotions, feelings, and thoughts because there is no limit to the number that may be produced, unlike emoticons and emoji. Expression stickers typically include elaborate, character-driven graphics and give users a quick and easy way to convey emotion, feelings, and/or specific thoughts.

Expression stickers may be created by virtually anyone: celebrities, comic producers, film studios, companies, messaging applications, internet providers, content providers, users, or any other interested party, and may be based on almost any content or event, such as film, television, and video screenshots, comic book pages, cultural events, counter-culture movements, self-produced image(s), etc., and may be accompanied by audio or text to provide very individualized expressions. Therefore, the content and number of expression stickers available and where they are available at any one time is very dynamic and changes daily. Many thousands of new expression stickers are created every day, while some expression stickers are removed from use, restricted, required to be paid for in order to continue using, etc., effectively removing them from availability for some or all users.

Currently, there is no way to manage all of the expression stickers that are available to a user across the various messaging applications accessible by the user.

SUMMARY

In one embodiment, a system includes a processing circuit, a memory, and logic integrated with the processing circuit, executable by the processing circuit, or integrated with and executable by the processing circuit. The logic is configured to cause the processing circuit to select a set of criteria related to managing expression stickers. The logic is also configured to cause the processing circuit to determine values for one or more of the set of criteria based on input from a first user. Also, the logic is configured to cause the processing circuit to store the values for the one or more of the set of criteria to a user profile created for the first user on the memory. In addition, the logic is configured to cause the processing circuit to determine one or more meanings for each expression sticker in a first set of expression stickers stored to the memory based on content and context of each expression sticker and context of the first set of expression stickers. Moreover, the logic is configured to cause the processing circuit to integrate the first set of expression stickers with an existing input interface of a plurality of messaging applications to allow the user to select one or more expression stickers from the first set of expression stickers when engaged in a chat or instant messaging session via one of the plurality of messaging applications.

In another embodiment, a computer program product includes a computer readable storage medium having program instructions embodied therewith. The embodied program instructions are executable by a processing circuit to cause the processing circuit to select, by the processing circuit, a set of criteria related to managing expression stickers. The embodied program instructions also cause the processing circuit to determine, by the processing circuit, values for one or more of the set of criteria based on input from a first user. In addition, the embodied program instructions cause the processing circuit to store, by the processing circuit, the values for the one or more of the set of criteria to a user profile created for the first user on a memory. Also, the embodied program instructions cause the processing circuit to determine, by the processing circuit, one or more meanings for each expression sticker in a first set of expression stickers stored to the memory based on content and context of each expression sticker and context of the first set of expression stickers. Moreover, the embodied program instructions cause the processing circuit to integrate, by the processing circuit, the first set of expression stickers with an existing input interface of a plurality of messaging applications to allow the user to select one or more expression stickers from the first set of expression stickers when engaged in a chat or instant messaging session via one of the plurality of messaging applications.

In yet another embodiment, a method includes selecting a set of criteria related to managing expression stickers. The method also includes determining values for one or more of the set of criteria based on input from a first user. In addition, the method includes storing the values for the one or more of the set of criteria to a user profile created for the first user on a memory. Additionally, the method includes determining one or more meanings for each expression sticker in a first set of expression stickers stored to the memory based on content and context of each expression sticker and context of the first set of expression stickers. Moreover, the method includes integrating the first set of expression stickers with an existing input interface of a plurality of messaging applications to allow the user to select one or more expression stickers from the first set of expression stickers when engaged in a chat or instant messaging session via one of the plurality of messaging applications.

Other aspects and embodiments of the present invention will become apparent from the following detailed description, which, when taken in conjunction with the drawings, illustrate by way of example the principles of the invention.

DETAILED DESCRIPTION

Figure 1:
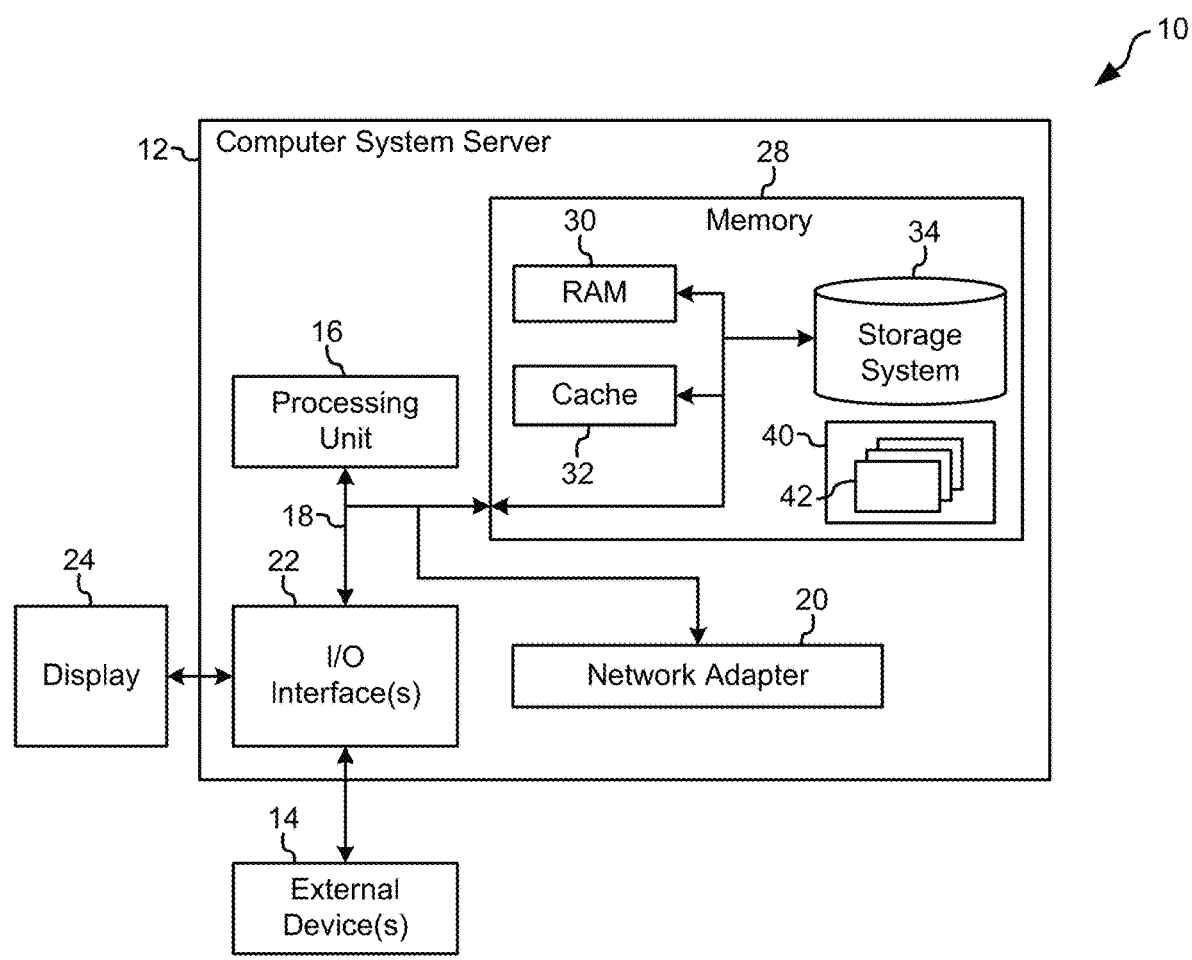
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about" ±10% of the value. For example, "about 10" indicates all values from and including 9.0 to 11.0.

The following description discloses several preferred embodiments of systems, methods, and computer program products that provide expression sticker management. Most messaging applications are capable of creating a chat session or instant messaging (IM) session that includes user-selected expression stickers. However, procurement, storage, retrieval, and access of the various expression stickers available to any one user is typically a manual process, with the expression stickers that are procured by the user being stored in many different locations on the user's devices, across different platforms and applications, and possibly not accessible on the different operating systems that power all the user's devices, e.g., smartphone, laptop computer, tablet PC, APPLE iPAD, APPLE iPHONE, etc.

In one general embodiment, a system includes a processing circuit, a memory, and logic integrated with the processing circuit, executable by the processing circuit, or integrated with and executable by the processing circuit. The logic is configured to cause the processing circuit to select a set of criteria related to managing expression stickers. The logic is also configured to cause the processing circuit to determine values for one or more of the set of criteria based on input from a first user. Also, the logic is configured to cause the processing circuit to store the values for the one or more of the set of criteria to a user profile created for the first user on the memory. In addition, the logic is configured to cause the processing circuit to determine one or more meanings for each expression sticker in a first set of expression stickers stored to the memory based on content and context of each expression sticker and context of the first set of expression stickers. Moreover, the logic is configured to cause the processing circuit to integrate the first set of expression stickers with an existing input interface of a plurality of messaging applications to allow the user to select one or more expression stickers from the first set of expression stickers when engaged in a chat or instant messaging session via one of the plurality of messaging applications.

In another general embodiment, a computer program product includes a computer readable storage medium having program instructions embodied therewith. The embodied program instructions are executable by a processing circuit to cause the processing circuit to select, by the processing circuit, a set of criteria related to managing expression stickers. The embodied program instructions also cause the processing circuit to determine, by the processing circuit, values for one or more of the set of criteria based on input from a first user. In addition, the embodied program instructions cause the processing circuit to store, by the processing circuit, the values for the one or more of the set of criteria to a user profile created for the first user on a memory. Also, the embodied program instructions cause the processing circuit to determine, by the processing circuit, one or more meanings for each expression sticker in a first set of expression stickers stored to the memory based on content and context of each expression sticker and context of the first set of expression stickers. Moreover, the embodied program instructions cause the processing circuit to integrate, by the processing circuit, the first set of expression stickers with an existing input interface of a plurality of messaging applications to allow the user to select one or more expression stickers from the first set of expression stickers when engaged in a chat or instant messaging session via one of the plurality of messaging applications.

In yet another general embodiment, a method includes selecting a set of criteria related to managing expression stickers. The method also includes determining values for one or more of the set of criteria based on input from a first user. In addition, the method includes storing the values for the one or more of the set of criteria to a user profile created for the first user on a memory. Additionally, the method includes determining one or more meanings for each expression sticker in a first set of expression stickers stored to the memory based on content and context of each expression sticker and context of the first set of expression stickers. Moreover, the method includes integrating the first set of expression stickers with an existing input interface of a plurality of messaging applications to allow the user to select one or more expression stickers from the first set of expression stickers when engaged in a chat or instant messaging session via one of the plurality of messaging applications.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
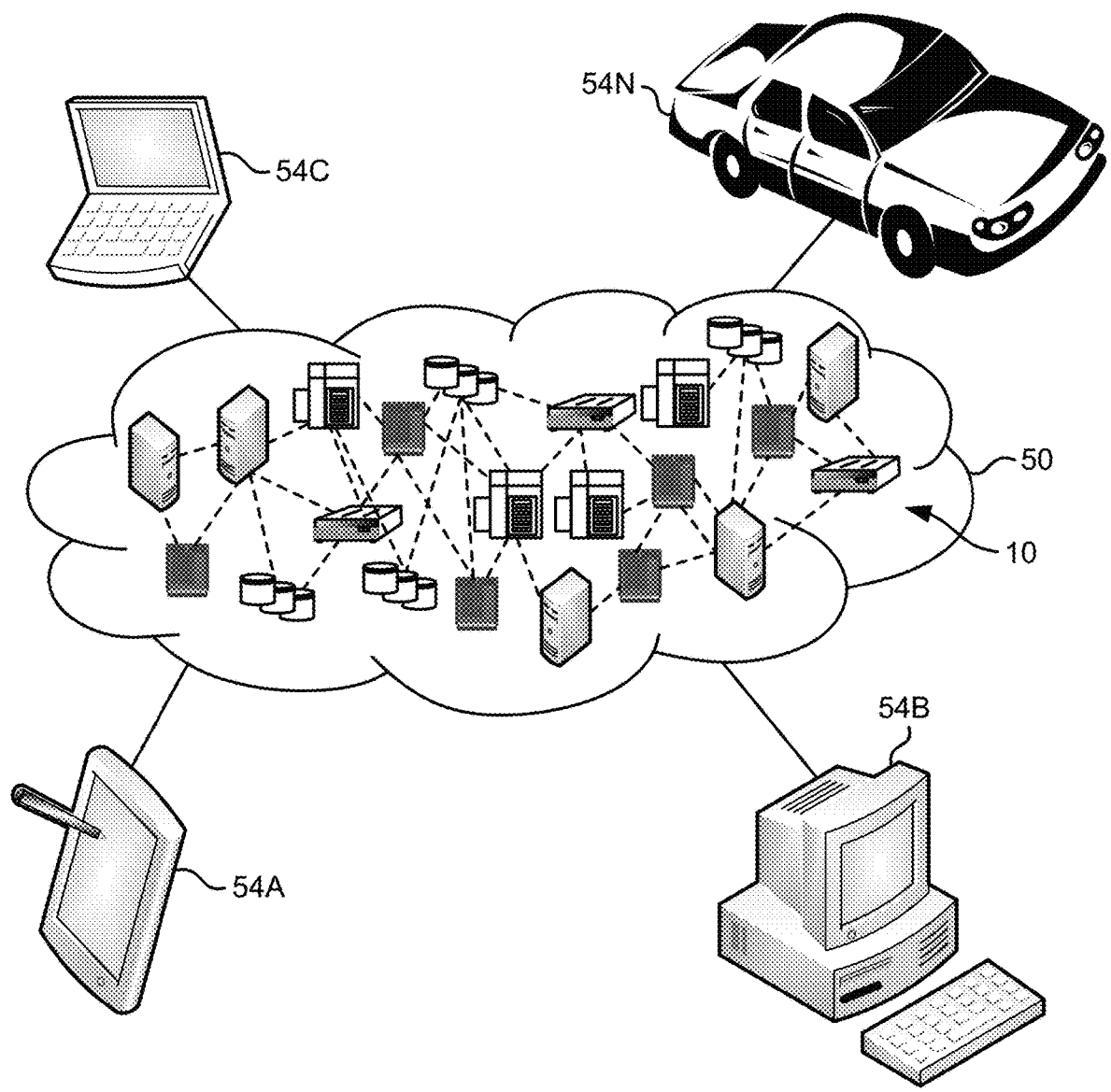
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
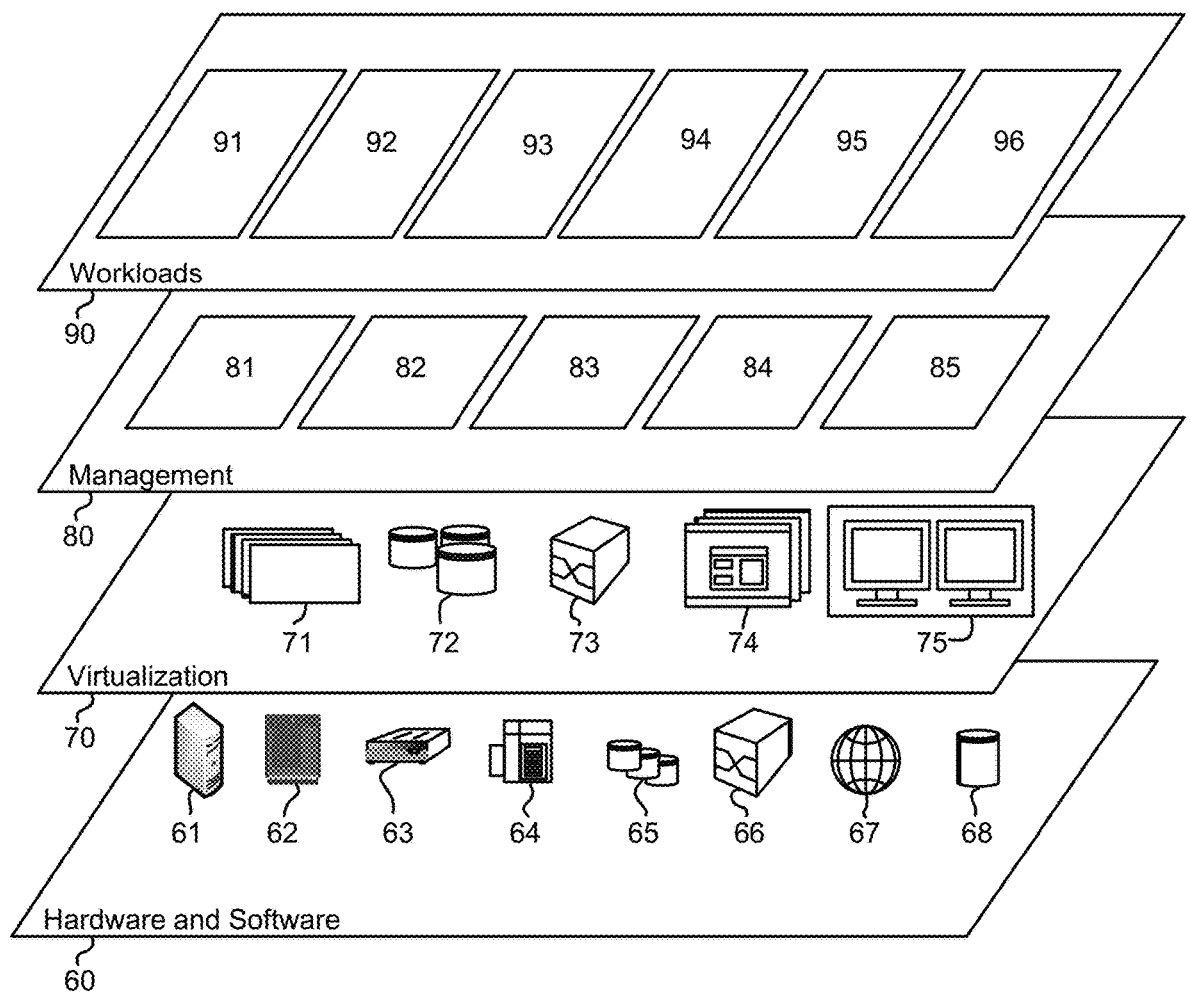
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic expression sticker management 96.

Expression stickers are popular for expressing emotion and feeling (like, dislike) on social media all across the world, and especially in China, South Korea, and Japan. There are over 700 million monthly active users (MAUs) on WeChat® with over 1.6 billion active accounts. Moreover, more than 1.18 billion people log onto Facebook daily generating about 4.5 billion likes each day. These social media applications, along with other dedicated messaging applications, provide an amazingly large number of users who make use of expression stickers. A lot of vendors produce a huge number of expression stickers for selling and downloading purposes across a vast array of different distribution and accumulation platforms. Also, many users are creating, downloading, uploading, and sharing new expression stickers across all forms of social media.

For example, users are shopping, exchanging, downloading, collecting, and using expression stickers. Most current input methods for messaging applications attempt to support expression stickers. Users are able to select and input downloaded expression stickers via an input interface.

Expression sticker management (such as collecting, cataloging, understanding, searching, selecting, and deleting) is a new endeavor for mobile vendors, application (app) developers for use on mobile devices, linguists, and support personnel worldwide. Other related areas will also be affected by the demand for expression stickers, such as deep learning and auto-didacticism-based knowledge management, etc. Cloud search and support application programming interfaces (APIs) will also be expanded to allow applications to match search queries against real-time data streams, such as those provided on social media, big-data analytics, deep question and answer (Q&A), machine translation, etc.

In order to provide dynamic expression sticker management, there are several factors to consider: 1) the ease of use for the user, 2) the ability to collect and store dynamic expression stickers from any of the plurality of suppliers thereof, and 3) the ability to access, sort, and utilize stored dynamic expression stickers in any operating messaging application from amongst the plurality of messaging applications available for use. Users want as easy of an experience as possible when collecting, storing, cataloguing, searching, selecting, and using a dynamic expression sticker in an ongoing chat or instant messaging session.

The expansion in the use of expression stickers worldwide has caused, and will continue to cause in greater amounts, many new demands, problems, and challenges. For example, users spend a lot of time managing the thousands of expression stickers available to any one user. It is complicated, error-prone, and time consuming to manage these expression stickers, and also difficult to utilize expression stickers that have been collected, as there is currently no way to manage all of the expression stickers in any one interface, as each set of expression stickers may be saved to a different folder and path, and each messaging application may only look in a select few locations on a local machine for expression stickers.

Some usage problems and management issues associated with expression stickers are described below. An unlimited number of expression stickers are available, which is different from the number of emoji characters available, which is finite, and therefore complicates the management of an infinite number of expression stickers. Also, due to the various sources of expression stickers, it is currently not possible to use a traditional management tool (e.g., a static IME dictionary and rules) to manage those unlimited expression stickers. Moreover, due to the multiple collection channels from which expression stickers may be acquired, there is currently no method available to consolidate all the collected expression stickers. In addition, because collected expression stickers may be used in more ways than other traditional emoji and emoticons, users are downloading, copying and pasting, etc., expression stickers from online stores, sharing them with friends and acquiring shared expression stickers from friends, collecting expression stickers via various social media applications, and all of these collection channels are managed in different ways.

Additionally, once an expression sticker is collected, there is no definitive way to determine how the expression sticker will be used, as it may have any number of expressions or feelings represented therein and/or applicable to a particular user community, along with one or more recognizable characters, which leads to somewhat ambiguous meanings, as only a portion of expression stickers actually have a short description attached thereto from which to derive context for using the expression sticker. Very few expression stickers have an explicit meaning included in some fashion, and how these meanings are indicated by the expression sticker varies depending on the source. Therefore, users or some other system or person identifies the meaning of each expression sticker prior to being able to effectively use the stickers in messaging applications.

Furthermore, many expression stickers have a finite or limited effective duration when a user will actually want to use the expression sticker. This is because many expression stickers are based on popular or "viral" events and pop culture, which is notoriously fickle and has a short life-cycle. For example, movie character quotes and images are very popular when the movies featuring that character are in the theaters, but people stop quoting the character once the movies had been released for a period of time. Also, expression stickers may be related to special events, such as a major sporting event like the Olympics, World Cup, Stanley Cup Finals, etc., a presidential election, a movie release, etc. Again, users may not be interested in expression stickers based on such events once the event is over, and may want to delete those old expression stickers.

Currently, all of these issues are dealt with by users manually. Accordingly, to overcome these issues, in one embodiment, a method of dynamic expression sticker management is provided that aids users to easily and quickly collect, store, catalogue, search, select, and use expression stickers. In a first embodiment, the method describes a running-time management framework for transparently classifying expression stickers according to characteristics and preferences of the user. In a further embodiment, the method defines expression sticker meaning and usage analysis and catalogs the expression stickers based on the determined meaning. In another embodiment, the method provides a dynamic input interface that integrates the cataloged expression stickers and recommends new collected expression stickers to the user for selection during a chat or instant messaging session. Furthermore, in some embodiments, a real-time leaning feature is provided to validate the recommended expression stickers.

Figure 4:
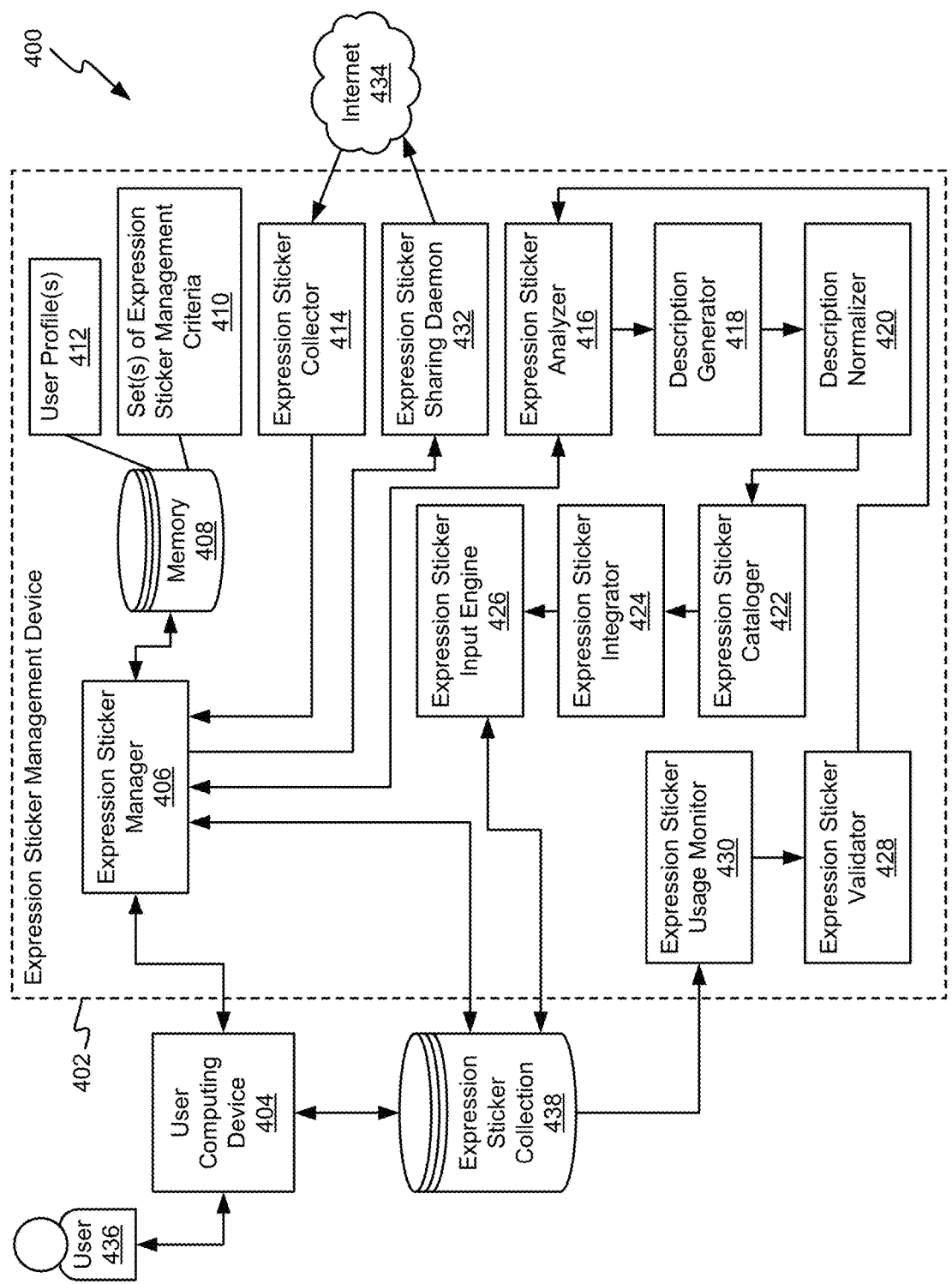
FIG. 4 shows a block diagram of an architecture, according to one embodiment.

Now referring to FIG. 4, a block diagram of an architecture 400 that is configured for expression sticker management is shown according to one embodiment. The architecture 400 is configured to provide proactive cognitive IM and chat group management that securely groups users in a virtual chat session without exposing sensitive personal information of the users. The architecture 400 includes two different components, an expression sticker management device 402 and a user computing device 404.

The expression sticker management device 402 includes an expression sticker manager module 406, which includes a user interface (e.g., a graphical user interface (GUI) or some other suitable interface) that is configured to allow a user to configure and manage the expression sticker operations, procedures, rules, etc. This expression sticker manager module 406 is the connection between the user and the expression sticker management device 402.

The expression sticker management device 402 also includes a memory 408 that may include any type of memory described herein or otherwise known in the art. Within this memory 408, one or more sets of expression sticker management criteria 410 and one or more user profiles 412 are stored for use in expression sticker management. Each set of expression sticker management criteria 410 is a collection of customized rules that dictate management of certain aspects of the various expression stickers that may be collected over time and stored within the architecture 400 or made accessible to the architecture 400, in various approaches. The rules may include, but are not limited to, how, where, when, and what to collect, catalog, normalize, sort, search, recommend, select, and delete as it relates to expression stickers. The criteria may be linked to a specific user profile 412 when the user specifies certain aspects of one set of expression sticker management criteria 410. In addition, a default set of expression sticker management criteria 410 is also stored in the memory 408 for use in expression sticker management when no user profile exists, or no rule is specified in a user profile 412 that overrides the default management rules.

Each user profile 412 is a file or information construct that includes service criteria and other personal characteristics of a particular user. For example, various characteristics, personalities, likes, dislikes, favorites, etc., may be determined for a particular user and stored to the user profile 412 for that user. Some exemplary information that may be included in a user profile 412 includes, but is not limited to, native language, preferred language, age, gender, education, social media applications used, expression sticker resource sites used, channels used to obtain expression stickers, preferences on types of expression stickers to collect, etc.

The expression sticker management device 402 also includes an expression sticker collector 414, which is a module configured to collect, purchase, trade, obtain, acquire, or otherwise get expression stickers from one or more of a plurality of different expression sticker resources (e.g., messaging applications, social media websites, Internet websites generally, friends, co-workers, content providers, etc.), via one or more of a plurality of different channels (e.g., chatting sessions, file transfer protocol (FTP), connected devices like memory, computers, etc., via download from a website, via download from an expression sticker sever, via email, via text, etc.) according to related expression sticker management criteria 410.

The expression sticker management device 402 also includes an expression sticker analyzer 416, which is a module configured to determine one or more meanings for each expression sticker. Because an expression sticker can have multiple applicable meanings, this module may attribute more than one meaning for an expression sticker, as appropriate. For example, an expression sticker of a smiling face may be attributed a meaning of "happy" and a meaning of "funny," as a smiling face may be used to denote either feeling. Of course, many more such situations may arise, and the expression sticker analyzer 416 may deal with each situation distinctly for each expression sticker.

In one embodiment, the expression sticker analyzer 416 may utilize any number of indicia of meaning to determine the one or more meanings for any one expression sticker. Some exemplary indicia that may be used to determine meaning include, but are not limited to, a description associated with an expression sticker, content of the expression sticker, an image of the expression sticker, context information related to the expression sticker or a set of expression stickers in which the expression sticker is obtained, etc. To utilize such indicia, in a further embodiment, the expression sticker analyzer 416 may include a description extractor, content and image sentiment analyzer, optical character recognition (OCR) module for understanding text within images, etc.

The expression sticker management device 402 also includes a description generator 418 which is a module configured to generate expression sticker description(s) according to output of the expression sticker analyzer 416. The description generator 418 may be used whenever an expression sticker lacks a description, or an associated description is inadequate for describing the actual expression sticker, as determined from input from a user, context of when the expression sticker is used, or any other reason for modifying a description as would be known to one of skill in the art upon reading the present descriptions. A description may be a single word, or a set of words that describe the use, content, and/or intent of the expression sticker, and may be used by a user to indicate which expression sticker to use, and/or for searching, sorting, filtering, and selecting expression stickers for use in messaging applications.

The expression sticker management device 402 also includes a description normalizer 420 which is a module configured to normalize the expression descriptions. Normalization may include automatic translation of descriptions into one or more different languages (for example, translating each description into a preferred language based on a user profile), adhering to naming conventions designated in a user profile, ensuring description lengths are all within a pre-set maximum character count, ensuring that all descriptions and/or names and/or titles of expression stickers and expression sticker sets all adhere to rules and conventions included in the sets of expression sticker management criteria 410, etc. Normalization is a process that is understood by those of skill in the art, and any additional services may be performed in accordance with what one of skill in the art would understand normalization to include, in various additional embodiments.

The expression sticker management device 402 also includes an expression sticker cataloger 422, which is a module configured to catalogue or otherwise index at least some of the expression stickers collected through the various channels and stored to a memory accessible to the architecture 400. In one embodiment, the collected expression stickers may be stored to an expression sticker collection 438 accessible to the expression sticker management device 402 and also to the user computing device 404.

The expression sticker cataloger 422 may rank the collected expression stickers according to the meaning(s), type, selection frequency, accepted rating by the user, and/or any other features, aspects, and/or characteristics of the expression stickers. Moreover, the expression sticker cataloger 422 may sort, filter, search, and move or interrelate the various collected expression stickers in accordance with any rules or conventions specified by the various sets of expression sticker management criteria 410, such that any particular user will be presented with a collection of expression stickers which appear as desired by the user.

The expression sticker management device 402 also includes an expression sticker integrator 424, which is a module configured to integrate one or more sets of expression stickers or individual expression stickers thereof into one or more existing input interface for one or more messaging applications used by at least one of the users. In this way, a user may select and input one of the collected expression stickers into a chat or instant message via a standard interface input of the messaging application without requiring additional operations to enter such expression stickers. This provides a uniform and recognizable interface for entry of expression stickers that a user expects, and that changes with any associated updates from the messaging application being used.

The expression sticker management device 402 also includes an expression sticker input engine 426, as needed, which is a module configured to search and select a set of related and appropriate expression stickers for a particular use specified by a user in a chat or instant message. Specifically, this engine determines, based on any available information related to the message and expression stickers collected, which expression stickers a user is most likely to select for entry into a specific message. These determined most likely-to-be-used expression stickers are then displayed to the user, such as via an integrated input method editor (IME), so that the user may ultimately select the desired expression sticker for entry in the message from amongst the displayed expression stickers.

In a further embodiment, the user may input one or more keywords into the IME, and these keywords may be used to search, sort, and filter the collected expression stickers to determine most likely-to-be-used expression stickers to display. For example, if the user enters "happy," then only those expression stickers which are most likely to correspond to the feeling of "happy" will be displayed, with those expression stickers which relate to "sad," "mad," "angry," "confused," etc., not being displayed.

The expression sticker management device 402 also includes an expression sticker validator 428, which is a module configured to validate a meaning for the various collected expression stickers based on when a user selects particular expression stickers (which may determine a time of day, time of month, time of year, and/or special event correlation for expression stickers), what context the message has when an expression sticker is selected (which may determine a meaning of an expression sticker which is different from that currently determined), how often an expression sticker is selected (use versus non-use), along with explicit user feedback regarding expression stickers (a message may ask a user to rate an expression sticker, e.g., 1 to 5, and any expression sticker receiving a low rating may be removed from the collection). In another example, the module may validate that a recommended expression sticker is properly cataloged or improperly catalogued based on the user selection rating.

The expression sticker management device 402 also includes an expression sticker usage monitor 430 which is a module configured to monitor expression sticker usage, as the user selects or chooses not to select certain expression stickers over time. This helps to further enhance the user profile, as frequently used expression stickers may be returned with priority over those which are not frequently used. This information may also be used to remove those expression stickers which are not used by the user.

The expression sticker management device 402 also includes an expression sticker sharing daemon 432, which is a module configured to share collected expression stickers with other users, such as via the Internet 434, social media applications, email, text, or any other communication channel known in the art.

The user computing device 404 is configured to receive the determined most likely-to-be-used expression stickers from the expression sticker management device 402 and/or directly from the expression sticker collection 438 with instruction from the expression sticker management device 402 as to which of the various collected expression stickers are those which are most likely to be used in any specific set of circumstances. The user computing device 404 is also configured to display to the user 436, for selection thereof, the determined most likely-to-be-used expression stickers and input a selected expression sticker or stickers into a chat or instant message via one or more messaging applications operating on the user computing device 404.

Figure 5:
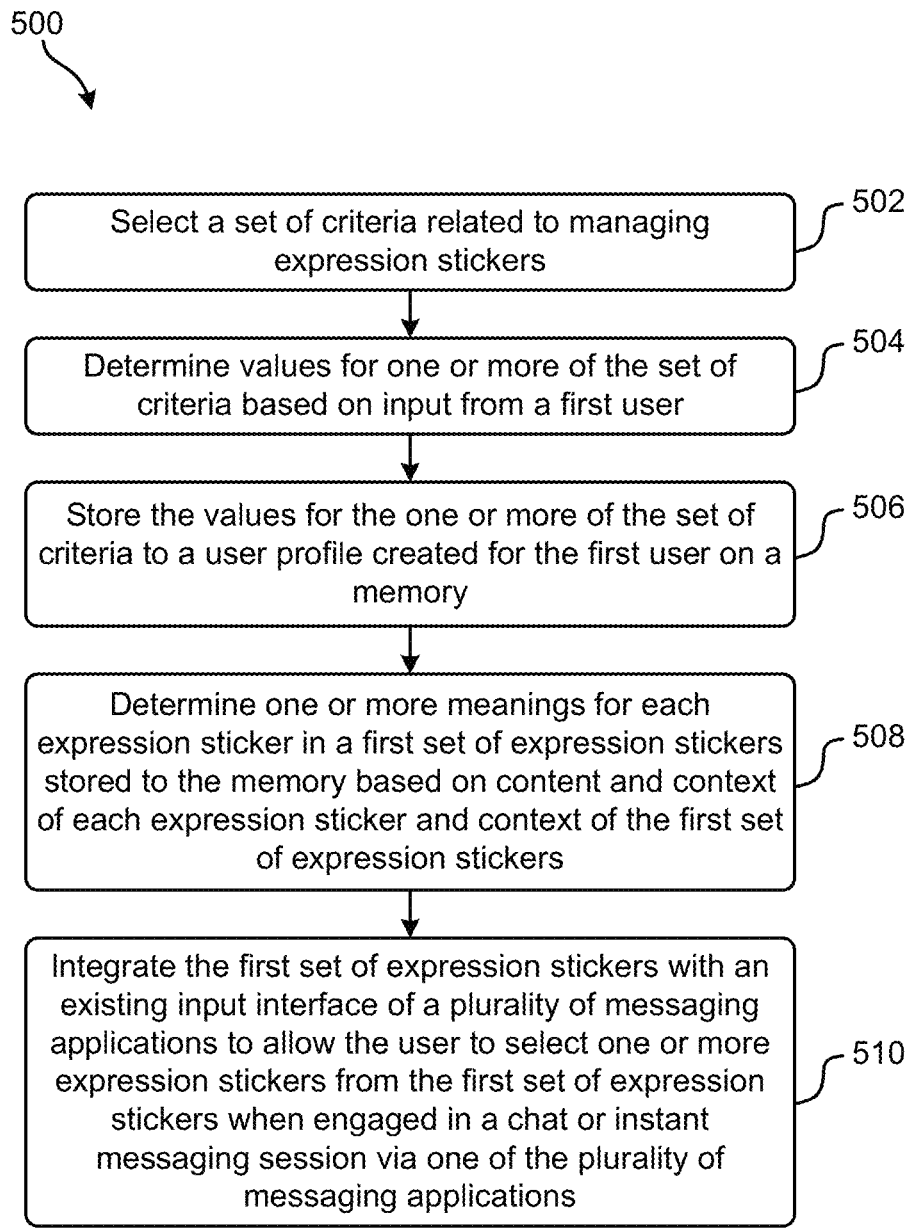
FIG. 5 shows a flowchart of a method, according to another embodiment.

Now referring to FIG. 5, a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a cloud server, a portable computer, a handheld or wearable computer, a processing circuit having one or more processors therein, or some other device having one or more processors therein. The processing circuit, e.g., processor(s), chip(s), and/or module(s) implemented in hardware and/or software, and preferably having at least one hardware component, may be utilized in any device to perform one or more steps of the method 500. Illustrative processors include, but are not limited to, a microprocessor, a CPU, an ASIC, a FPGA, etc., combinations thereof, or any other suitable computing device known in the art.

As shown in FIG. 5, method 500 may start with operation 502, where a set of criteria related to managing expression stickers is selected. This set of criteria is specifically chosen to manage expression stickers (e.g., filter, categorize, sort, delete, search, etc.) that are discovered online, stored to a local memory, stored to a remote memory, available from a cloud-based system, and/or acquired through some other channel (such as shared with the user from friends, collected from email correspondence, collected in social media interactions, etc.).

In one embodiment, the set of criteria may include any or all of the following information: a time to retain expression stickers in local memory, a total number of expression stickers to display and/or make available to a user when inputting a message in a chat or instant messaging session, a native language of the user, a preferred language for the user, age of the user, gender of the user, education level of the user (e.g., high school, some college, college graduate, etc.), which messaging applications the user utilizes, resources where the user collects expression stickers, channels from which the user acquires expression stickers, and one or more favorite types of expression stickers (e.g., phrases, characters, certain emotions, special events, etc.).

In operation 504, values for one or more of the set of criteria are determined based on input from a user. This user may be requested to input values for the criteria, and however many of the set of criteria have values entered therefor by the user, will then be able to be used for managing expression stickers. For example, the user may indicate that the preferred language is English (the value is "English" with the criterion being "preferred language" in this example), expression stickers should be maintained for at least 4 weeks (the value is "4 weeks" with the criterion being "length to keep expression stickers in memory" in this example), and expression stickers will be collected from a certain selected social media applications (the value is the name of the social media applications, e.g., "Facebook®," "WeChat®," and "Instagram®," with the criterion being "collection source(s)").

In operation 506, the values for the one or more of the set of criteria are stored to a user profile created for the user in an accessible memory, such as a local memory or remote memory coupled to a processor executing method 500. In this way, these values and preferences may be referred to again when expression sticker management is used in regard to this specific user. This process may be repeated for as many users as are managed in method 500, and various different criteria may be stored for any of the users.

In operation 508, one or more meanings for each expression sticker in a first set of expression stickers stored to the memory is determined based on content and context of each expression sticker and context of the first set of expression stickers. The content of an expression sticker may include any associated description, title, or name, type of file (audio, image, video), colors included in an image, sounds in an audio file, character shown in an image, action, feeling, or expression represented, etc.

Context of the expression sticker may include the conditions in which a user chooses to use the expression sticker (e.g., responding to a happy conversation would indicate a "happy emotion" sticker, expressing shock would indicate a "shock" sticker, sending condolences would indicate a "sad" sticker, etc.), a name or title of a set of expression stickers which includes the particular expression sticker, a time of year in which the expression sticker is obtained (around Christmas time may indicate a Christmas themed expression sticker, around the Super Bowl may indicate a football or Super Bowl themed expression sticker, etc.), other expressions represented by stickers within the same set, a time of day in which the expression sticker is obtained, a time of day in which the expression sticker is utilized, etc.

Context of the set of expression stickers may include a name or title of the set, a time of year in which the set is obtained (around Christmas time may indicate a Christmas themed expression sticker, around the Super Bowl may indicate a football or Super Bowl themed expression sticker, etc.), a channel on which the set is obtained (e.g., a set obtained from Intel® may indicate Intel branded expression stickers, a set obtained from McDonald's® may indicate McDonald's themed expression stickers, etc.), etc.

In operation 510, the first set of expression stickers is integrated with an existing input interface of a plurality of messaging applications to allow the user to select one or more expression stickers from the first set of expression stickers when engaged in a chat or instant messaging session via one of the plurality of messaging applications. In this way, the first set of expression stickers may be used within any messaging application in which the user wants to use one of the expression stickers, without requiring a specific interface to be utilized (e.g., the expression stickers may be utilized from within the messaging application instead of via a secondary application that overlays the messaging application, such that the input is seamless with the input of emoji or other expression-related symbols within the messaging application.

Method 500 may further include, in one embodiment, generating a description of the first set of expression stickers based on the context of the first set of expression stickers. This operation may be performed in response to determining that description provided with the set is inadequate to use to sort and filter the expression stickers within the set, or no description exists. Further, method 500 may include normalizing the descriptions for the first set of expression stickers with descriptions of any other sets of expression stickers stored to the memory. In this operation, because a similar naming and description scheme is desired for all sets of expression stickers, in response to determining that any of the sets of expression stickers do not have a common look and feel for the name and/or description, then any of these values may be adjusted to maintain the similar look and feel for easy management of the various collected expression stickers.

For example, if most of the names begin with a capital letter, then a name which does not begin with a capital letter may be adjusted to start with a capital letter. Similarly, in another example, if most descriptions of sets indicates a provider of the stickers, and one set does not indicate the provider, the description may be adjusted to indicate the provider. Of course, any other naming schemes, description commonalities, or other desired adjustments may be ensured during the normalization process, in various embodiments.

In yet another embodiment, method 500 may include generating descriptions for one or more expression stickers in the first set of expression stickers that do not have a description based on the one or more meanings thereof. For example, when all stickers are positive, then a description may indicate the positive nature of the stickers. In another example, if all stickers are related to a sporting event, then a description for each sticker may indicate the sporting event. Moreover, when a meaning of a sticker is ascertained, then the description may include the exact meaning of the expression sticker, so that the sticker may be sorted and filtered for use in messaging applications. Further, method 500 may include normalizing the descriptions for all of the expression stickers in the first set of expression stickers with descriptions of other expression stickers stored to the memory. In this operation, because a similar naming and description scheme is desired for all expression stickers, in response to determining that any of the expression stickers do not have a common look and feel for the name and/or description, then any of these values may be adjusted to maintain the similar look and feel.

For example, if most of the names begin with a capital letter, then a name which does not begin with a capital letter may be adjusted to start with a capital letter. Similarly, in another example, if most descriptions of expression stickers indicates a provider of the sticker, and one expression sticker does not indicate the provider, the description may be adjusted to indicate the provider. Of course, any other naming schemes, description commonalities, or other desired adjustments may be ensured during the normalization process, in various embodiments.

According to another embodiment, method 500 may include collecting a second set of expression stickers from a second expression sticker source via a second channel. In this embodiment, the first set of expression stickers are not collected via the second channel, such that however the first set of expression stickers are acquired, it is via a different channel than the second set of expression stickers. The second set of expression stickers are then stored to the memory, and one or more meanings for each expression sticker in the second set of expression stickers is determined based on content and context of each expression sticker and context of the second set of expression stickers.

According to yet another embodiment, method 500 may include cataloguing each expression sticker in the first set of expression stickers based on at least one meaning of each of the expression stickers stored to the memory and based on context of the first set of expression stickers. In this way, not only does at least one of the meanings of each expression sticker dictate how and why the expression sticker is retrieved from memory for use in chat or IM messaging, but also the context of the first set of expression stickers, such that any unique context of the set may also dictate when and why a particular expression sticker is provided for use in a chat or instant message.

In another embodiment, the first set of expression stickers may be integrated with the existing input interface of the plurality of messaging applications via an IME. In one such embodiment, method 500 may include integrating the first set of expression stickers into an existing input method module of at least one of the plurality of messaging applications, searching the first set of expression stickers based on an input from the user when engaged in the chat or instant messaging session via the at least one of the plurality of messaging applications, selectively displaying, via an integrated IME to the user, a subset of expression stickers stored to the memory that correspond to the input from the user, and receiving selection from the user of one or more preferred expression stickers from the subset of expression stickers.

Accordingly, in another further embodiment, method 500 may include selectively displaying, via an interface or IME to the user when engaged in the chat or instant messaging session via a messaging application, a subset of expression stickers stored to the memory that correspond to one or more keywords entered by the user via the interface. Thus, as a user enters at least one keyword, certain selected expression stickers may be displayed, when desired, for input into the chat or instant message, that correspond with the keyword(s) entered.

For example, should a user enter the keyword "Xmas," expression stickers that have a meaning, description, content, and/or context that relates to Christmas may be displayed for entry in the chat or instant message. In another embodiment, in response to a user entering keywords of "happy" and "monkey," all expression stickers that have a meaning, description, content, or context that relates to happy or monkey may be displayed for entry in the chat or instant message, with those that have a relationship with both keywords "happy" and "monkey" being displayed prior to the other expression stickers that relate to only one keyword. Moreover, a statistical correlation algorithm may be utilized to determine a correlation between expression stickers, meanings, and keyword(s) entered by the user, with any suitable statistical correlation algorithm, as would be understood by one of skill in the art, to be used in various embodiments. This ensures that the displayed expression stickers are suitable for the chat or instant message being entered.

In another embodiment, method 500 may include validating a meaning of at least one expression sticker used by the user when engaged in the chat or instant messaging session via a messaging application based on conditions that preceded or triggered selection of the at least one expression sticker. In this embodiment, how, when, where, and why the user selected a particular expression sticker may be used to determine whether the meaning associated with the expression sticker is correctly determined. If the conditions indicate that the expression sticker is incorrectly defined, then a new meaning may be added to the expression sticker (and possibly a contradictory meaning may be removed).

Moreover, method 500 may include monitoring usage of all expression stickers stored to the memory, to ensure that associated meanings and descriptions are accurate, over time as the stickers are used, or not used. Furthermore, one or more expression stickers from the first set of expression stickers may be deleted from the memory after non-usage for greater than a predetermined period of time (e.g., 1 week, 4 weeks, 3 months, 6 months, 1 year, etc.) or in response to receiving an explicit delete request from the user. In addition, as memory fills up, those stickers that have been used the least recently may be deleted to provide more space for new stickers that may be used more frequently.

In another embodiment, one or more expression stickers from the first set of expression stickers may be shared with one or more other users via a first channel, such that the expression stickers in the first set may be utilized by the other user(s). This first channel may be a social media application, email, text message, or some other suitable communication channel known in the art.

According to another embodiment, user feedback may be utilized to determine usefulness, meaning(s), content, context, or some other aspect of an expression sticker. This user feedback may be received in response to an inquiry, or unsolicited.

Method 500 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic. The logic is configured to cause the processing circuit to perform method 500.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 500.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a processing circuit;
   a memory; and
   logic integrated with the processing circuit, executable by the processing circuit, or integrated with and executable by the processing circuit, the logic being configured to cause the processing circuit to:
   select, by the processing circuit, a set of criteria related to managing expression stickers, wherein an expression sticker comprises at least one non-textual element;
   determine values for one or more of the criteria in the set based on input from a first user;
   store the values for the one or more of the criteria to a user profile created for the first user on the memory;
   determine one or more meanings for each expression sticker in a first set of expression stickers stored to the memory based on content and context of each expression sticker and context of the first set of expression stickers, the expression stickers in the first set of expression stickers including audio and/or video; and
   integrate the first set of expression stickers with an existing input interface of a plurality of messaging applications;
   search, by the processing circuit, the first set of expression stickers based on an input from the user when the user is engaged in a chat or instant messaging session via one of the plurality of messaging applications;
   select, by the processing circuit, the expression stickers determined to correspond to the input from the user;
   selectively display to the user, by the processing circuit via an integrated input method editor (IME), a subset of the expression stickers that correspond to the input from the user; and
   receive selection from the user, by the processing circuit, of one or more preferred expression stickers from the subset of the expression stickers.

2. The system as recited in claim 1, wherein the logic is further configured to cause the processing circuit to:
   generate a description of the first set of expression stickers based on the context of the first set of expression stickers;
   normalize the descriptions for the first set of expression stickers with descriptions of other sets of expression stickers stored to the memory;
   generate descriptions for one or more expression stickers in the first set of expression stickers that do not have a description based on the one or more meanings thereof; and
   normalize the descriptions for all of the expression stickers in the first set of expression stickers with descriptions of other expression stickers stored to the memory.

3. The system as recited in claim 1, wherein the logic is further configured to cause the processing circuit to:
   collect a second set of expression stickers from a second expression sticker source via a second channel, wherein the first set of expression stickers are not collected via the second channel;
   store the second set of expression stickers to the memory; and
   determine one or more meanings for each expression sticker in the second set of expression stickers based on content and context of each expression sticker and context of the second set of expression stickers.

4. The system as recited in claim 1,
   wherein the content of each expression sticker is unstructured data selected from the group consisting of: an associated description, a title, a type of file, colors included in an image, an expression represented by a character,
   wherein the context of each expression sticker is selected from the group consisting of: a condition, a time, and a date,
   wherein the context of the first set of expression stickers is selected from the group consisting of: a name of the first set of expression stickers, a time of obtaining the first set of expression stickers, a date of obtaining the first set of expression stickers, a channel from which the first set of expression stickers was obtained; and
   wherein the logic is further configured to cause the processing circuit to catalogue each expression sticker in the first set of expression stickers based on at least one meaning of each of the expression stickers stored to the memory and based on context of the first set of expression stickers.

5. The system as recited in claim 1, wherein the logic configured to integrate the first set of expression stickers with the existing input interface of the plurality of messaging applications further causes the processing circuit to:
   integrate the first set of expression stickers into an existing input method module of at least one of the plurality of messaging applications;
   search the first set of expression stickers based on an input from the user when engaged in the chat or instant messaging session via the at least one of the plurality of messaging applications;
   selectively display, via an integrated input method editor (IME) to the user, a subset of expression stickers stored to the memory that correspond to the input from the user; and
   receive, from the user, selection of one or more preferred expression stickers from the subset of expression stickers.

6. The system as recited in claim 1, wherein the logic is further configured to cause the processing circuit to:
   validate a meaning of at least one expression sticker used by the user when engaged in the chat or instant messaging session via the one of the plurality of messaging applications based on conditions that preceded and/or triggered selection of the at least one expression sticker;
monitor usage of all expression stickers stored to the memory;
delete one or more expression stickers from the first set of expression stickers from the memory after non-usage for greater than a predetermined period of time or in response to receiving an explicit delete request from the user; and
share one or more expression stickers from the first set of expression stickers with one or more other users via a first channel.

7. The system as recited in claim 2, wherein the description of the first set of expression stickers based on the context of the first set of expression stickers is selected from the group consisting of: a nature of the first set of expression stickers, an event associated with of the first set of expression stickers, a meaning of the first set of expression stickers, and a provider of the first set of expression stickers.

8. A computer program product, the computer program product comprising a computer readable storage medium having program instructions embodied therewith, the embodied program instructions being executable by a processing circuit to cause the processing circuit to:
select, by the processing circuit, a set of criteria related to managing expression stickers,
wherein an expression sticker comprises at least one non-textual element;
determine, by the processing circuit, values for one or more of the set of criteria based on input from a first user;
store, by the processing circuit, the values for the one or more of the set of criteria to a user profile created for the first user on a memory;
determine, by the processing circuit, one or more meanings for each expression sticker in a first set of expression stickers stored to the memory based on content and context of each expression sticker and context of the first set of expression stickers, the expression stickers in the first set of expression stickers including audio and video;
integrate, by the processing circuit, the first set of expression stickers with an existing input interface of a plurality of messaging applications;
search, by the processing circuit, the first set of expression stickers based on an input from the user when the user is engaged in a chat and/or instant messaging session via one of the plurality of messaging applications;
select, by the processing circuit, the expression stickers determined to correspond to the input from the user;
selectively display to the user, by the processing circuit via an integrated input method editor (IME), a subset of the expression stickers that correspond to the input from the user; and
receive selection from the user, by the processing circuit, of one or more preferred expression stickers from the subset of the expression stickers.

9. The computer program product as recited in claim 8, wherein the embodied program instructions are further executable by the processing circuit to cause the processing circuit to:
generate, by the processing circuit, a description of the first set of expression stickers based on the context of the first set of expression stickers;
normalize, by the processing circuit, the descriptions for the first set of expression stickers with descriptions of other sets of expression stickers stored to the memory;
generate, by the processing circuit, descriptions for one or more expression stickers in the first set of expression stickers that do not have a description based on the one or more meanings thereof; and
normalize, by the processing circuit, the descriptions for all of the expression stickers in the first set of expression stickers with descriptions of other expression stickers stored to the memory,
wherein the normalization includes at least one adjustment selected from the group consisting of: complying with a naming convention, including a provider for the one or more expression stickers in the first set of expression stickers and translating descriptions for one or more expression stickers in the first set of expression stickers.

10. The computer program product as recited in claim 8, wherein the embodied program instructions are further executable by the processing circuit to cause the processing circuit to:
collect, by the processing circuit, a second set of expression stickers from a second expression sticker source via a second channel, wherein the first set of expression stickers are not collected via the second channel;
store, by the processing circuit, the second set of expression stickers to the memory; and
determine, by the processing circuit, one or more meanings for each expression sticker in the second set of expression stickers based on content and context of each expression sticker and context of the second set of expression stickers,
wherein the content of each expression sticker is unstructured data selected from the group consisting of: an associated description, a title, a type of file, colors included in an image, an expression represented by a character,
wherein the context of each expression sticker is selected from the group consisting of: a condition, a time, and a date,
wherein the context of the second set of expression stickers is selected from the group consisting of: a name of the first set of expression stickers, a time of obtaining the first set of expression stickers, a date of obtaining the first set of expression stickers, a channel from which the first set of expression stickers was obtained.

11. The computer program product as recited in claim 8, wherein the embodied program instructions are further executable by the processing circuit to cause the processing circuit to:
catalogue, by the processing circuit, each expression sticker in the first set of expression stickers based on at least one meaning of each of the expression stickers stored to the memory and based on context of the first set of expression stickers.

12. The computer program product as recited in claim 8, wherein the embodied program instructions are further executable by the processing circuit to cause the processing circuit to:
validate, by the processing circuit, a meaning of at least one expression sticker used by the user when engaged in the chat and/or instant messaging session via the one of the plurality of messaging applications based on conditions that preceded and/or triggered selection of the at least one expression sticker;

monitor, by the processing circuit, usage of all expression stickers stored to the memory;

delete, by the processing circuit, one or more expression stickers from the first set of expression stickers from the memory after non-usage for greater than a predetermined period of time or in response to receiving an explicit delete request from the user; and share, by the processing circuit, one or more expression stickers from the first set of expression stickers with one or more other users via a first channel.

13. A method, comprising:

selecting, by a processing circuit, a set of criteria related to managing expression stickers, wherein an expression sticker comprises at least one non-textual element;

determining values for one or more of the set of criteria based on input from a first user;

storing the values for the one or more of the set of criteria to a user profile created for the first user on a memory;

determining one or more meanings for each expression sticker in a first set of expression stickers stored to the memory based on content and context of each expression sticker and context of the first set of expression stickers, the context of the first set of expression stickers including a time of year in which the first set of expression stickers is obtained, the expression stickers in the first set of expression stickers including audio and/or video; and integrating the first set of expression stickers with an existing input interface of a plurality of messaging applications;

searching, by the processing circuit, the first set of expression stickers based on an input from the user when the user is engaged in a chat or instant messaging session via one of the plurality of messaging applications;

selecting, by the processing circuit, the expression stickers determined to correspond to the input from the user;

selectively displaying to the user, by the processing circuit via an integrated input method editor (IME), a subset of the expression stickers that correspond to the input from the user; and receiving selection from the user, by the processing circuit, of one or more preferred expression stickers from the subset of the expression stickers.

14. The method as recited in claim 13, further comprising:

generating a description of the first set of expression stickers based on the context of the first set of expression stickers;

normalizing the descriptions for the first set of expression stickers with descriptions of other sets of expression stickers stored to the memory;

generating descriptions for one or more expression stickers in the first set of expression stickers that do not have a description based on the one or more meanings thereof; and normalizing the descriptions for all of the expression stickers in the first set of expression stickers with descriptions of other expression stickers stored to the memory.

15. The method as recited in claim 13, further comprising:

collecting a second set of expression stickers from a second expression sticker source via a second channel, wherein the first set of expression stickers are not collected via the second channel;

storing the second set of expression stickers to the memory; and determining one or more meanings for each expression sticker in the second set of expression stickers based on content and context of each expression sticker and context of the second set of expression stickers.

16. The method as recited in claim 13, further comprising:

cataloguing each expression sticker in the first set of expression stickers based on at least one meaning of each of the expression stickers stored to the memory and based on context of the first set of expression stickers.

17. The method as recited in claim 13, wherein the integrating the first set of expression stickers with the existing input interface of the plurality of messaging applications further comprises:

integrating the first set of expression stickers into an existing input method module of at least one of the plurality of messaging applications;

searching the first set of expression stickers based on an input from the user when engaged in the chat or instant messaging session via the at least one of the plurality of messaging applications;

selectively displaying, via an integrated input method editor (IME) to the user, a subset of expression stickers stored to the memory that correspond to the input from the user; and receiving selection from the user of one or more preferred expression stickers from the subset of expression stickers.

18. The method as recited in claim 13, further comprising:

validating a meaning of at least one expression sticker used by the user when engaged in the chat or instant messaging session via the one of the plurality of messaging applications based on conditions that preceded and/or triggered selection of the at least one expression sticker;

monitoring usage of all expression stickers stored to the memory, deleting one or more expression stickers from the first set of expression stickers from the memory after non-usage for greater than a predetermined period of time or in response to receiving an explicit delete request from the user; and sharing one or more expression stickers from the first set of expression stickers with one or more other users via a first channel.

19. The method as recited in claim 14, wherein the description of the first set of expression stickers based on the context of the first set of expression stickers is selected from the group consisting of: a nature of the first set of expression stickers, an event associated with of the first set of expression stickers, a meaning of the first set of expression stickers, and a provider of the first set of expression stickers.

\* \* \* \* \*